March 29, 1955   J. E. HAMMARSTRÖM   2,705,035
BOW SAW
Filed March 5, 1951
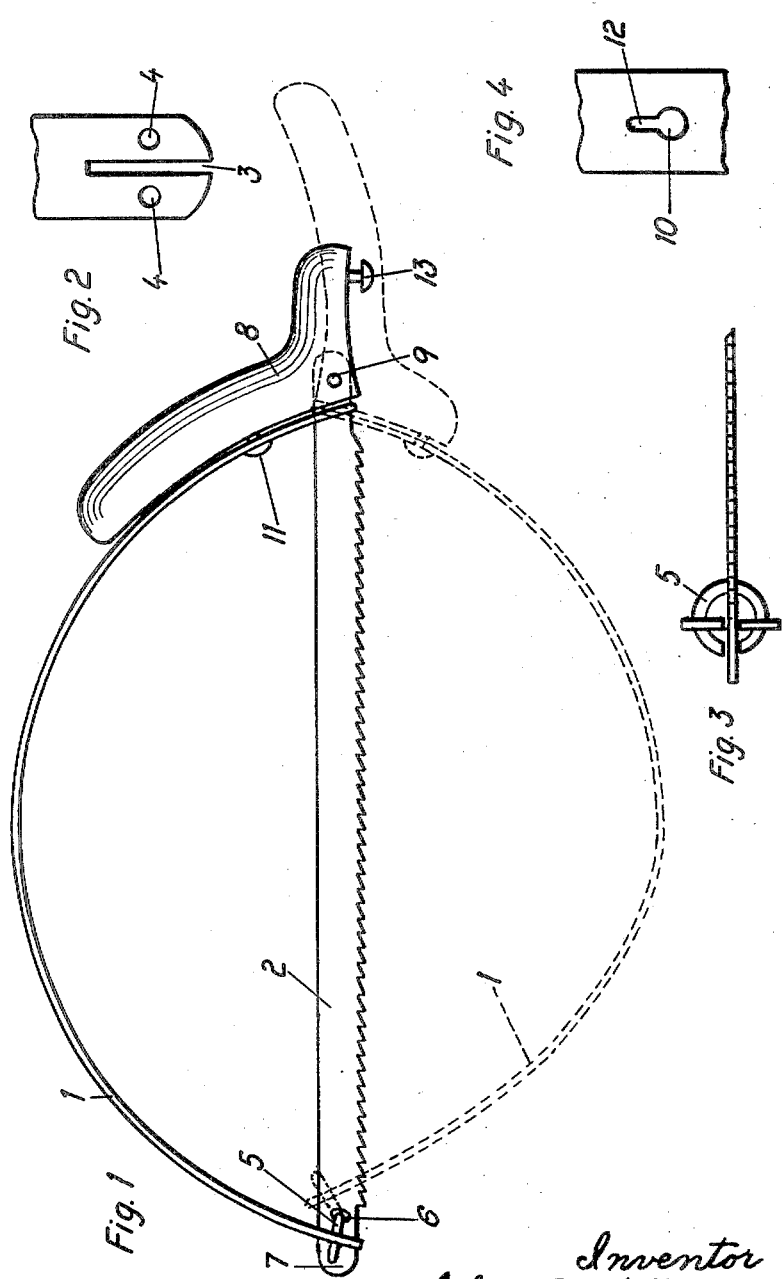
Inventor
Johan Evert Hammarstrom
by Sommers & Young
Attorneys

United States Patent Office 2,705,035
Patented Mar. 29, 1955

2,705,035
BOW SAW

Johan Evert Hammarström, Sandviken, Sweden, assignor to Sandvikens Jernverks Aktiebolag, Sandviken, Sweden Application March 5, 1951, Serial No. 213,908

Claims priority, application Sweden July 4, 1950

4 Claims. (Cl. 145—33)

The present invention relates to bow saws, and more particularly to a bow saw intended for domestic work.

It has been the practice in the past to tension the saw blades of bow saws by tensioning means of various kinds which exert tension upon the bow. These known tensioning means are, however, usually rather complicated and increase the cost of the saws.

The main object of the invention is to completely eliminate the need of tensioning means and this object of the invention is attained by giving the bow the form of a leaf spring one end portion of which is connected to one end of the saw blade while the other end portion through the spring tension is held in engagement with a handle connected to the other end of the saw blade.

The bow may, when not under tension, be straight which means very moderate storage and transport spaces. Due to the flat form of the bow this can readily be bent into engagement with the handle.

Another object of the invention is to provide a bow saw wherein the bow can be swung about one end of the saw blade so as to engage the handle on either side of the saw blade whereby either of the edges thereof may be used for sawing operations without any need of being detached from the bow.

The invention is more fully described in the following specification and illustrated in the accompanying drawing, in which:

Fig. 1 is a side elevation of a saw according to the invention.

Fig. 2 is a fragmentary view on a larger scale of the left end portion of the bow as shown in Fig. 1.

Fig. 3 is a view likewise on an enlarged scale of a device for interconnecting the bow and the saw blade, and Fig. 4 is a view of a portion of the bow engageable against a handle.

The numeral 1 designates a bow which according to the invention consists of a leaf spring both of whose ends are slotted (Fig. 2) in order to receive the ends of a saw blade 2. The left end of the bow as shown in Fig. 1 is on both sides of the slot 3 provided with holes 4. A cut through ring 5 (Fig. 3) is inserted into the holes 4 and a hole 6 (Fig. 1) provided in the saw blade 2. This last-mentioned hole 6 is situated at such a distance from the saw blade end 7 that this when the saw blade is tensioned prevents the ring from turning and thus loosening the connection between the saw blade and the bow. The other end of the saw blade is likewise provided with a hole through which extends a pin 9 mounted in a handle 8, which thus is pivotally connected to the saw blade.

The saw blade is retained tensioned by engagement between the bow 1 and the handle 8. In order to secure the bow and the handle in correct mutual positions the former is provided with a recess 10 and a slot 12 and the latter with a pin 11 having a head. When the saw is being assembled this head is introduced in the recess 10 and the bow 1 then moved in relation to the handle in such a manner that the pin 11 will engage the slot 12 whereby the head locks the bow to the handle. The arrangement is such that the tension in the bow tends to maintain the engagement between the pin and the slot. When the saw is to be dismantled the operation is reversed. If desirable, the slot 12 may be dispensed with.

The connection between the bow 1 and the left end of the saw blade as shown in Fig. 1 allows the bow to be tilted completely about this end and brought into a new engagement with the handle 8 which due to its pivotal mounting on another pin 9 is tilted so as to bring a locking pin 13 fastened to the handle into engagement with the recess 10. The new positions of the bow 1 and the handle 8 are indicated by dotted lines in Fig. 1. The upper edge of the saw blade as shown in this figure can now be used for sawing or cutting operations and may be provided with a dentation or cutting edge of a type differing from that of the opposite edge. Obviously, the usefulness of the saw is considerably increased in this manner. The embodiment of the handle 8 described and shown here is especially suited for cutting operations when positioned as indicated by the dotted lines.

It is to be understood that many modifications and changes may be made in the embodiments shown and described herein without departing from the scope of the invention as defined in the following claims.

Having now described my invention, what I claim as new and desire to secure by Letters Patent is:

1. A bow saw having a leaf spring bow, one end portion of which is pivotally and detachably connected to one end of a saw blade by means of a disengaging coupling, a handle having two relatively angularly related surfaces pivotally connected to the other end of the saw blade, the other end portion of the leaf spring bow, in one tensioned position being detachably held in engagement with one surface of the handle, said surface extending along a substantial part of the tensioned bow, from a point close to the point of attachment between said handle and the saw blade through the tension of the leaf spring bow, said bow being pivotally displaceable around said one end of the saw blade into a second tensioned position with said other end portion being held in engagement with the other surface of the handle along the tensioned bow, extending from a point near said point of attachment between the handle and the saw blade through the tension of the bow.

2. A bow saw according to claim 1, and in which the leaf spring bow has a notch and each surface on the handle has a peg for engagement with a notch in the leaf spring bow.

3. A bow saw according to claim 1, and in which the end portions of the bow are slotted so as to receive the ends of the saw blade, said one end portion of the bow having recesses on both sides of the slot, said saw blade having an opening adjacent said one end of the blade, and a split ring engaging through the recesses in the bow and the opening through the blade for connecting the blade to the bow.

4. A bow saw having a leaf spring bow, one end portion of which is pivotally and detachably connected to one end of a saw blade by means of a disengaging coupling, a handle having two relatively angularly related surfaces pivotally connected to the other end of the saw blade, the other end portion of the leaf spring bow, in one tensioned position, being detachably held in engagement with one surface of the handle, said surface extending along a substantial part of the tensioned bow, from a point close to the point of attachment between said handle and the saw blade through the tension of the leaf spring bow, said bow being pivotally displaceable more than 180° around said one end of the saw blade into a second position.

References Cited in the file of this patent
UNITED STATES PATENTS

| 73,341 | Jones | Jan. 14, 1868 |
|---|---|---|
| 440,174 | Marston | Nov. 11, 1890 |
| 605,597 | Clements | June 14, 1898 |
| 865,348 | Allison | Sept. 10, 1907 |
| 1,387,274 | Killian | Aug. 9, 1921 |